United States Patent
Cooley

(12) United States Patent (10) Patent No.: US 7,546,349 B1
Cooley (45) Date of Patent: Jun. 9, 2009

(54) AUTOMATIC GENERATION OF DISPOSABLE E-MAIL ADDRESSES

(75) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1022 days.

(21) Appl. No.: 10/979,589

(22) Filed: Nov. 1, 2004

(51) Int. Cl.
G06F 15/16 (2006.01)

(52) U.S. Cl. .................... 709/206; 709/224; 726/26

(58) Field of Classification Search .................. 709/206, 709/207, 224; 726/26
See application file for complete search history.

(56) References Cited

U.S. PATENT DOCUMENTS

| | | | |
|---|---|---|---|
| 5,675,710 | A | 10/1997 | Lewis |
| 5,826,249 | A | 10/1998 | Skeirik |
| 6,023,723 | A | 2/2000 | McCormick et al. |
| 6,052,709 | A | 4/2000 | Paul |
| 6,072,942 | A | 6/2000 | Stockwell et al. |
| 6,161,130 | A | 12/2000 | Horvitz et al. |
| 6,167,434 | A | 12/2000 | Pang |
| 6,249,807 | B1 | 6/2001 | Shaw et al. |
| 6,253,169 | B1 | 6/2001 | Apte et al. |
| 6,282,565 | B1 | 8/2001 | Shaw et al. |
| 6,289,416 | B1 | 9/2001 | Fukushima et al. |
| 6,298,351 | B1 | 10/2001 | Castelli et al. |
| 6,324,569 | B1 | 11/2001 | Ogilvie et al. |
| 6,347,310 | B1 | 2/2002 | Passera |
| 6,370,526 | B1 | 4/2002 | Agrawal et al. |
| 6,397,200 | B1 | 5/2002 | Lynch et al. |
| 6,397,215 | B1 | 5/2002 | Kreulen et al. |
| 6,421,709 | B1 | 7/2002 | McCormick et al. |
| 6,424,960 | B1 | 7/2002 | Lee et al. |
| 6,442,606 | B1 | 8/2002 | Subbaroyan et al. |
| 6,456,991 | B1 | 9/2002 | Srinivasa et al. |
| 6,487,586 | B2 | 11/2002 | Ogilvie et al. |
| 6,493,007 | B1 | 12/2002 | Pang |
| 6,502,082 | B1 | 12/2002 | Toyama et al. |
| 6,505,167 | B1 | 1/2003 | Horvitz et al. |
| 6,546,416 | B1 | 4/2003 | Kirsch |
| 6,591,291 | B1 * | 7/2003 | Gabber et al. ............... 709/206 |
| 6,640,301 | B1 | 10/2003 | Ng |
| 6,643,685 | B1 | 11/2003 | Millard |
| 6,650,890 | B1 | 11/2003 | Irlam et al. |
| 6,654,787 | B1 | 11/2003 | Aronson et al. |
| 6,687,740 | B1 | 2/2004 | Gough |

(Continued)

OTHER PUBLICATIONS

Cauce.org web pages [online] Coalition Against Unsolicited Commercial Email [retrieved Mar. 17, 2003] Retrieved from the Internet: <URL: http://www.cauce.org/about/problem.shtml>.

(Continued)

Primary Examiner—David Lazaro
(74) Attorney, Agent, or Firm—Fenwick & West LLP

(57) ABSTRACT

Methods, apparatuses, and computer-readable media for automatically generating disposable e-mail addresses. A method embodiment for generating disposable e-mail addresses comprises: monitoring (310) network traffic; detecting (320) the submission of a un-aliased e-mail address to a network destination; seeking (460) authorization to create a disposable e-mail address; creating (375) a disposable e-mail address; associating (380) the newly created disposable e-mail address with the corresponding network destination; and replacing (385) the un-aliased e-mail address with the disposable e-mail address.

23 Claims, 4 Drawing Sheets

U.S. PATENT DOCUMENTS

| | | | |
|---|---|---|---|
| 6,691,156 | B1 | 2/2004 | Drummond et al. |
| 6,697,942 | B1 | 2/2004 | L'Heureux |
| 6,701,347 | B1 | 3/2004 | Ogilvie |
| 6,711,608 | B1 | 3/2004 | Ogilvie |
| 6,732,157 | B1 | 5/2004 | Gordon et al. |
| 6,757,713 | B1 | 6/2004 | Ogilvie et al. |
| 6,757,830 | B1 | 6/2004 | Tarbotton et al. |
| 7,054,906 | B2 * | 5/2006 | Levosky .................... 709/206 |
| 7,305,445 | B2 * | 12/2007 | Singh et al. ................ 709/206 |
| 2002/0038308 | A1 | 3/2002 | Cappi |
| 2002/0087641 | A1 | 7/2002 | Levosky |
| 2002/0087649 | A1 | 7/2002 | Horvitz |
| 2002/0138525 | A1 | 9/2002 | Karadimitriou et al. |
| 2002/0138581 | A1 | 9/2002 | MacIntosh et al. |
| 2002/0147694 | A1 | 10/2002 | Dempsey et al. |
| 2002/0147782 | A1 | 10/2002 | Dimitrova et al. |
| 2002/0199186 | A1 | 12/2002 | Ali et al. |
| 2002/0199194 | A1 | 12/2002 | Ali |
| 2003/0033587 | A1 | 2/2003 | Ferguson et al. |
| 2003/0149726 | A1 | 8/2003 | Spear |
| 2003/0167311 | A1 | 9/2003 | Kirsch |
| 2003/0191969 | A1 | 10/2003 | Katsikas |
| 2003/0200334 | A1 | 10/2003 | Grynberg |
| 2003/0220978 | A1 | 11/2003 | Rhodes |
| 2003/0229672 | A1 | 12/2003 | Kohn |
| 2003/0233415 | A1 | 12/2003 | Beyda |
| 2004/0003283 | A1 | 1/2004 | Goodman et al. |
| 2004/0024823 | A1 | 2/2004 | Del Monte |
| 2004/0054887 | A1 | 3/2004 | Paulsen et al. |
| 2004/0064734 | A1 | 4/2004 | Ehrlich |
| 2004/0068534 | A1 | 4/2004 | Angermayr et al. |
| 2004/0073617 | A1 | 4/2004 | Milliken et al. |
| 2004/0093383 | A1 | 5/2004 | Huang et al. |
| 2004/0093384 | A1 | 5/2004 | Shipp |
| 2004/0111480 | A1 | 6/2004 | Yue |
| 2004/0148358 | A1 | 7/2004 | Singh et al. |
| 2004/0205173 | A1 | 10/2004 | Hall |
| 2005/0114453 | A1 * | 5/2005 | Hardt .................... 709/206 |
| 2006/0041621 | A1 * | 2/2006 | Libbey .................... 709/206 |

OTHER PUBLICATIONS

Outlook.spambully.com web pages [online] Spam Bully [retrieved Jan. 16, 2003] Copyright 2002, Retrieved from the Internet <URL: http://outlook.spambully.com/about.php>.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>.

How it Works:Spam Recognition, http://www.death2spam.net/docs/classifier.html, retrieved Aug. 18, 2005, U.S.A.

Cavnar, William B. et al., "N-Gram-Based Text Categorization", Proceedings of SDAIR-94, 3rd Annual Symposium on Document Analysis and Information Retrieval, Las Vegas, NV., USA, Apr. 13, 1994.

"N-Gram-Based Text Categorization", 2 pages, downloaded from http://citeseer.ist.psu.edu/68861.html, Aug. 25, 2005 U.S.A.

TextCat Language Guesser, 2 pages, downloaded from http:/odur.let.rug.nl/~vannoord/Textcat/ on Aug. 25, 2005., U.S.A.

Spam Assassin, The Apache SpamAssasin Project, 2 pages, downloaded from http:/spamassasin.apache.org on Aug. 25, 2005, U.S.A.

Basis Technology's Rosette Language Identifier, 2 pages, downloaded from http:/www.basistech.com/language-identification/ on Aug. 25, 2005, U.S.A.

Karp-Rabin algorithm, 3 pages, downloaded from http:/www-igm.univ-mlv.fr/~lecroq/string/node5.html on Sep. 1, 2005, U.S.A.

Rabin-Karp string search algorithm, 5 pages, downloaded from http://en.wikipedia.org/wiki/Rabin-Karp_string_search_alogrithm on Aug. 31, 2005 U.S.A.

The Rabin-Karp algorithm, String searching via Hashing, 5 pages, downloaded from http://www.eecs.harvard.edu/~ellard/Q-97/HTML/root/node43 on Aug. 31, 2005 U.S.A.

"Technical Responses to Spam," Nov. 2003, Taughannock Networks.

Kularski, C., "Compound Procedures for Spam Control," Highland School of Technology, Jan. 2004.

NBEC/NWOCA Anti-Spam Tools, http://home.nwoca.org Jul. 7, 2004.

Cranor, Faith, L., LaMacchia, Brian A., "Spam!" Communications of the ACM, vol. 41, No. 8, pp. 74-83, Aug. 1998. U.S.A.

* cited by examiner

AUTOMATIC GENERATION OF DISPOSABLE E-MAIL ADDRESSES

TECHNICAL FIELD

This invention pertains to the field of disposable e-mail addresses, and particularly to the automatic generation of disposable e-mail addresses.

RELATED APPLICATION

This application is related to commonly assigned U.S. patent application Ser. No. 10/980,122 entitled "Automated Disablement of Disposable E-mail Addresses Based on User Actions," filed Nov. 1, 2004, now U.S. Pat. No. 7,197,539, which is hereby incorporated by reference in its entirety into the present patent application.

BACKGROUND ART

Spam is a type of malicious computer code. It is sometimes referred to as electronic junk mail or junk newsgroup postings. Spam is generally e-mail advertising for some product sent to a mailing list or newsgroup. It can be generally defined as unsolicited and unwanted e-mail or other electronic messages.

In addition to wasting people's time with unwanted e-mail, spam also consumes a lot of network bandwidth. Consequently, there are many organizations, as well as individuals, who have taken it upon themselves to fight spam with a variety of techniques. As the Internet is public, little can be done to prevent spam, just as it is impossible to prevent paper junk mail from arriving in a real mailbox. However, some online services have instituted policies to prevent spammers from spamming their subscribers. One such technique involves using disposable e-mail addresses.

A disposable e-mail address is an alias of a real e-mail account. Oftentimes a web page or other online service of some type requires divulging an e-mail address to complete the transaction or request. Rather than providing a real e-mail address, one or more aliases are created that are used to interact with the requesting entity. From the entity's perspective, the entity has a legitimate e-mail address through which it may communicate. As shown in FIG. 1 (Prior Art), e-mail using a disposable e-mail address is directed to a Disposable E-Mail server (DEA server) 110. In many senses a DEA server operates as any other e-mail server. E-mails directed to the server are routed to the correct recipient. DEA servers operate under the presumption that a single user may have several disposable e-mails. These e-mails may be active or be disabled to help in the control of spam. The DEA server, therefore, first determines 120 whether the disposable e-mail address has been disabled. Typically, upon verification that spam exists, the disposable e-mail address corresponding to the spam is shut down 130 or canceled, stopping the unwanted spam from arriving in the user's inbox. In situations where the disposable e-mail address is active, the DEA server looks up 150 the real or un-aliased e-mail address associated with the disposable e-mail address, and forwards 160 the message to the real e-mail account. Some DEA servers also perform anti-spam checks 140 or apply anti-spam filters. Typically, a disposable e-mail server is interposed between the user or client computer and the regular e-mail server, website, news server, or the like.

Since a single user can have multiple disposable e-mail addresses, having a compromised disposable e-mail address resulting in a deluge of spam or other malicious code does not carry with it the connotations of having to cancel the user's e-mail service, contacting the user's legitimate contacts with a new e-mail address, and so forth. The solution to the compromised e-mail address is as simple as disposing of the disposable e-mail address.

The use of disposable e-mail addresses is not without its challenges. Twenty websites necessitating e-mail addresses to complete the transaction may require the generation of twenty or more aliases. Creating a new disposable e-mail for each new interaction with a website can be time consuming and awkward. Typically, the creation of a new disposable e-mail address requires opening a new browser window and establishing the disposable e-mail account. Once completed the user must return to the original website to complete the transaction. Using a single disposable e-mail address for multiple sites diminishes its usefulness. When multiple entities or sites are associated with a single alias, and that alias is found to be the recipient of spam, it is unclear what website or entity is responsible for the spam. The spam is eliminated, but at the cost of severing communication with legitimate websites. The time consuming and efficient creation of disposable e-mail addresses has slowed their acceptance as a valuable tool in the fight against spam.

There remains a need to automate the generation of disposable e-mail addresses. The present invention addresses these and other problems, as well as provides additional benefits.

DISCLOSURE OF INVENTION

Methods, apparatuses, and computer-readable media for automatically generating disposable e-mail addresses. A method embodiment for generating disposable e-mail addresses comprises: monitoring (310) network traffic; detecting (320) the submission of an un-aliased e-mail address to a network destination; seeking (460) authorization to create a disposable e-mail address; creating (375) a disposable e-mail address; associating (380) the newly created disposable e-mail address with the corresponding network destination; and replacing (385) the un-aliased e-mail address with the disposable e-mail address.

BRIEF DESCRIPTION OF THE DRAWINGS

These and other more detailed and specific objects and features of the present invention are more fully disclosed in the following specification, reference being to the accompanying drawings, in which.

DETAILED DESCRIPTION OF THE PREFERRED EMBODIMENTS

The present invention automatically creates disposable e-mail addresses based on a user's network activity. By monitoring a user's interaction with the Internet or other networks, and by possessing knowledge of the user's un-aliased e-mail address, the present invention intelligently prompts the user to create a new disposable e-mail address for any given website, newsgroup, or other on-line activity that seeks the user's un-aliased e-mail address. The present invention also stores previously created disposable e-mail addresses and automatically replaces the user's un-aliased e-mail address with the previously created disposable e-mail address when the user returns to a site.

The present invention offers the following advantages over the prior art:
- seamlessly integrating the creation of disposable e-mail addresses with a user's network environment;
- decreasing the procedural steps required to effectively create a disposable e-mail address for a given recipient;
- increasing the user's control of spam through effective use of disposable e-mail addresses, and;
- improving the user's e-mail and network environment by decreasing the presence of spam.

Spam has become ubiquitous, and, for most people, spam represents the scourge of e-mail. A disposable e-mail address is one of the most effective tools available for fighting spam. The present invention facilitates the use of disposable e-mail addresses by monitoring a user's network activity and actively prompting the user to create a disposable e-mail address before the user discloses his or her un-aliased e-mail address over the Internet or another network. Upon gaining authorization from the user to create a disposable e-mail address, the present invention generates a new disposable e-mail address correlated with the website, entity, e-mail recipient, or the like that has requested the user's un-aliased e-mail address. In addition, the present invention stores the disposable e-mail addresses, and should the user return to the website or location associated with this disposable e-mail address, the present invention seamlessly replaces the user's un-aliased e-mail address with the previously created disposable e-mail address. The present invention reduces the imposition faced by the user to generate and manage disposable e-mail addresses.

Figure 1:
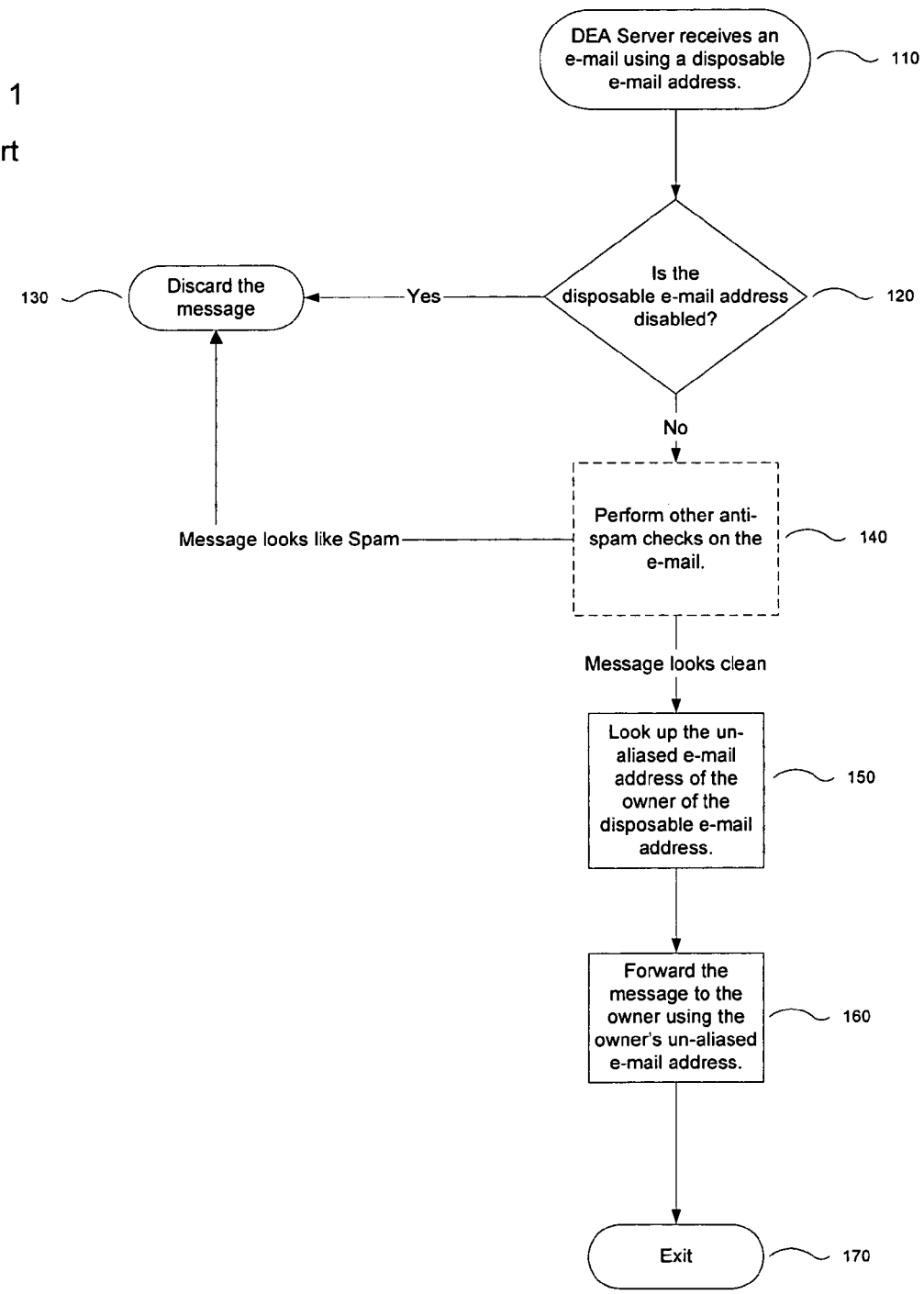
FIG. 1 (Prior Art) is a flow diagram of typical processing of an e-mail message using a disposable e-mail address through a DEA server.
Figure 2:
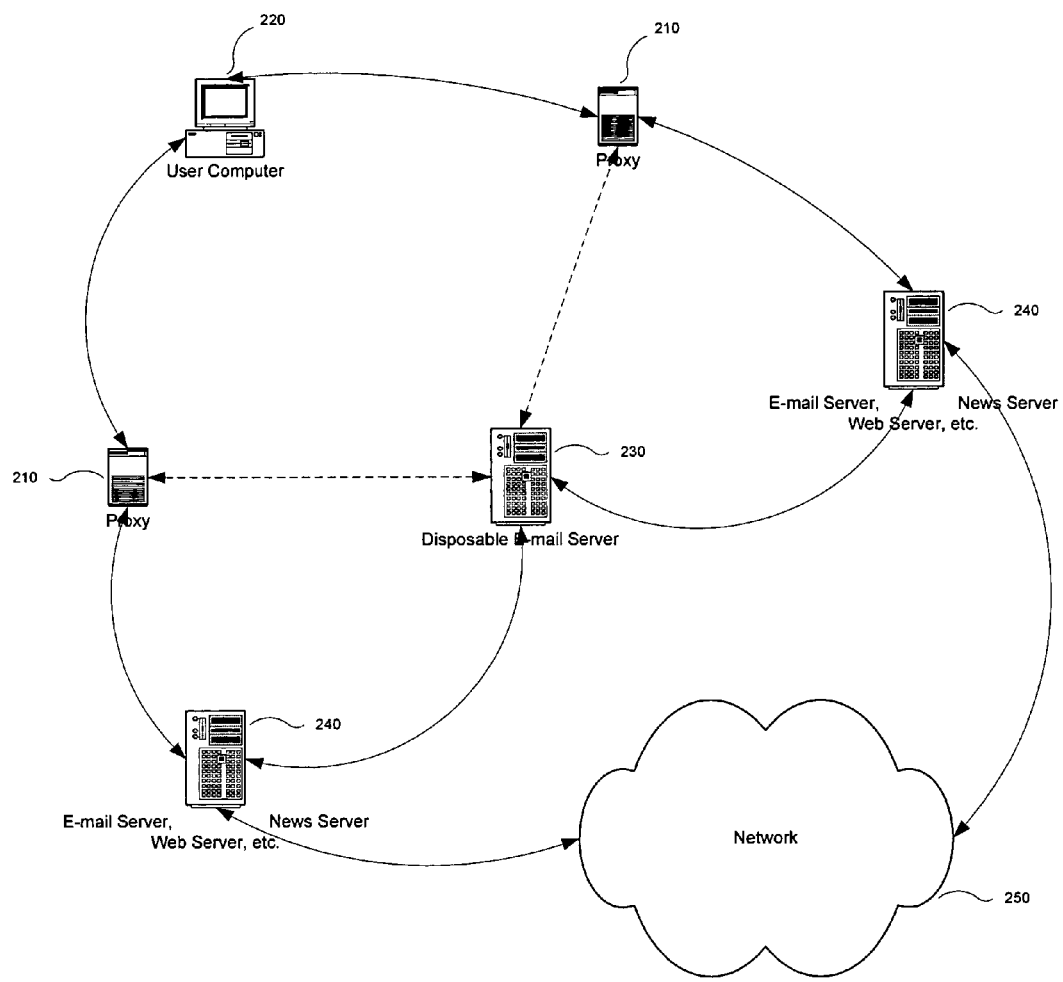
FIG. 2 is a block diagram of a network environment showing one embodiment of the present invention as a proxy 210, capable of automatically generating disposable e-mail addresses, interposed between a user's computer 220 and a server 240.

FIG. 2 presents a block diagram of a network environment wherein one embodiment of the present invention, in the form of a proxy 210, is interposed between a user's computer 220 and a server 240. In this embodiment, the proxy 210 is capable of automatically generating disposable e-mail addresses. In other embodiments, the capability of automatically generating disposable e-mail addresses may occur locally or be distributed throughout a communications network. As shown in FIG. 2, the proxy 210 is communicatively coupled to and interposed between a user computer 220 and e-mail server, news server, web server, or the like 240. The servers 240 are in turn coupled to a network 250 such as a local area network, wide area network, the Internet, or other network environment as known to one skilled in the relevant art. As networks typically contain multiple server computers, proxies 210 are positioned to intercept and monitor 410 communication traffic between the user computer 220 and the various servers 240. The proxies 210 and the server computers 240 are further communicatively coupled to a disposable e-mail server 230. While this embodiment presents a client/server architecture, the present invention can be adapted to and is equally suitable for peer to peer and other network architectures known to one skilled in the relevant art.

As a user interacts with the network, the proxy 210 monitors 410 communication traffic between the user computer 220 and a network server 240 to detect 430 the user's un-aliased e-mail address 420. Upon detection 430, the proxy 210 delays further transmission of the user's un-aliased e-mail address until the user is prompted 460 and the proxy receives direction from the user to either create a disposable e-mail address or authorize the release of the user's un-aliased e-mail address. In situations where the user has previously created a disposable e-mail address associated with the detected network interaction, the proxy 210 seamlessly replaces the user's un-aliased e-mail address with the disposable e-mail address that is stored by the proxy 210. In one embodiment, the proxy 210 informs the user that their un-aliased e-mail address has been replaced 485 by a previously created disposable e-mail address. For the purpose of the present invention, a user may be a human user or a device. A computer, processor, machine, or the like may be a user of electronic message services. Embodiments involving a mechanical or electronic user can automate the authorization to create disposable e-mail addresses.

Figure 3:
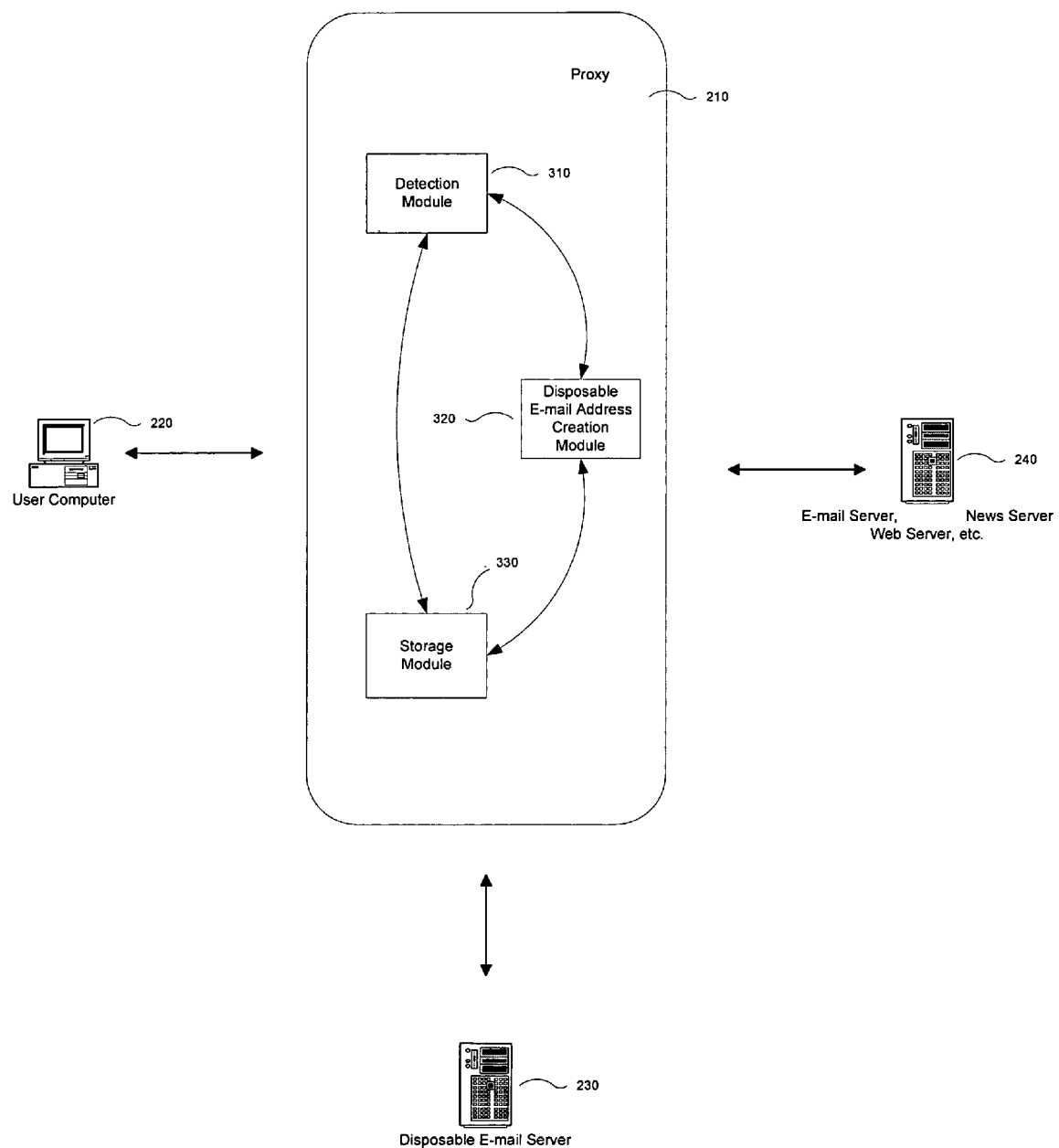
FIG. 3 is a block diagram of one apparatus embodiment of the present invention for automated creation of disposable e-mail addresses.

One embodiment of an apparatus for automatically creating disposable e-mail addresses is depicted in FIG. 3. A proxy 210, containing several functional modules, is interposed and communicatively coupled between a user computer 220 and a network server 240. While in this embodiment the modules comprising the present invention are housed on a proxy 210, it is contemplated that in other embodiments the modules may be housed locally on a server 240 or on a user computer 220. Further, the modules and their functionality may be housed in a distributed nature to utilize the advantages of distributed computing without decreasing or altering the advantages of the present invention. In the present embodiment, proxy 210 houses a detection module 310, a disposable e-mail creation module 320, and a storage module 330. Each module is communicatively coupled with the other modules to facilitate the sharing and communication of data.

As a user interacts with a website, newsgroup, e-mail recipient, or the like, the detection module 310 monitors 410 communication traffic between the user computer 220 and a network server 240 for content consistent with the user's un-aliased e-mail address. Upon detection 430 of the user's un-aliased e-mail address, the detection module 310 determines 450 whether the user has previously designated and used a disposable e-mail address for interactions with the current website, newsgroup, or e-mail recipient. This is accomplished by queries between the detection module 310 and the storage module 330. The storage module maintains a correlated list of disposable e-mail addresses and the recipients, website, or newsgroups to which they were sent. Once a submission 420 of a user's un-aliased e-mail address is detected 430, the detection module 310 queries the storage module 330 as to whether the recipient of the user's un-aliased e-mail address in the pending communication traffic is associated with a disposable e-mail address. In the situation where the storage module 330 returns the query in the affirmative, the detection module 310 requests the disposable e-mail address of the current communication recipient. The storage module 330 accesses the list of disposable e-mail addresses, and returns to the detection module 310 the disposable e-mail address associated with the recipient of the current communication stream.

A negative reply by the storage module 330, indicating that the current recipient of the user's un-aliased e-mail address does not have an associated disposable e-mail address, causes the detection module 310 to prompt 460 the user that the user's un-aliased e-mail address is about to be communicated to a new recipient, group or website. The prompt 460, in one embodiment, seeks direction from the user as to the creation of a disposable e-mail address for the on-going communication or permission to release the user's un-aliased e-mail address to the targeted recipient. In another embodiment, the use may select to have all pending releases of the user's un-aliased e-mail address replaced by a disposable e-mail address. In such a situation, the prompt serves to notify the user that a replacement has occurred. When the user elects to release his or her un-aliased e-mail address to the targeted recipient, the detection module 310 passes 490 the user's un-aliased e-mail address, and related data, to the targeted recipient, network destination or the like. In one embodiment, the detection module 310, in coordination with the storage module 330, stores identities of recipients of the user's un-aliased e-mail address, so that upon future detection 420 of the impending release of user's un-aliased e-mail address, the detection module 310 can determine that the release of the user's un-aliased e-mail address to the targeted recipient has been previously approved, thereby eliminating needless user prompting and interaction.

In the circumstances where the user responds affirmatively to the detection module's 310 query of whether the user would like to create a disposable e-mail address for the current transaction, the detection module 310 communicates with the creation module 320 to generate a disposable e-mail address. The creation module 320 collects 470 information about the communication traffic between the user computer 220 and the network server 240 to determine how the disposable e-mail address should be filtered. The type and extent of filtering parameters governing the use of the disposable e-mail addresses vary based on the needs of the user and the communication environment. Other means by which the creation module 320 can characterize the use of the disposable e-mail address, means that are well known to one skilled in the relevant art, can be implemented with the present invention without materially affecting its usefulness and effectiveness. In another embodiment, the creation module 320 queries the user to determine filtering parameters for the disposable e-mail address, while in yet another embodiment the detection module 320 develops filters based on the usage scope of the disposable e-mail address. This information can be added to the header of the newly created disposable e-mail address in the form of a tag.

In one embodiment the added information is in the form of an X-header which lists a code by which the DEA server can retrieve the correct disposable e-mail address. Network communications taking place via Simple Message Transport Protocol (SMTP), News Network Transfer Protocol (NNTP) and Internet Message Access Protocol (IMAP). These protocols use Multipurpose Internet Mail Extensions (MIME) as a way to convey information regarding the individual messages. MIME provides the capability of using X-headers. X-headers enable additional or extra information to be added to the header. According to MIME protocols, X-headers must be forwarded with the message. Thus the X-header is a logical place to locate tracking information regarding the e-mail.

For illustration purposes, a typical appended X-header for a manually created disposable e-mail address may take the form of X-DEA-VIA: tops@deaserver.com. Similarly, the X-header for a disposable e-mail address created automatically may take the form of X-DEA-VIA: x24ij34x@deaserver.com. Both of these headers would also have a validation header such as X-DEA-VALIDATION: {[8 hex character]-[4 hex character]}-{[4 hex character]-[4 hex character]-[12 hex character]}. The validation header prevents tampering of the header information. Additional X-headers can be added to incorporate additional information regarding the e-mail. Thus, the X-header information can be used to track the use and origin of the disposable e-mail address should it ever become a source of spam or other unsolicited e-mail.

With information regarding how to filter the disposable e-mail address collected 470, the creation module 320 communicates 475 with the disposable e-mail server 230 for the creation of a disposable e-mail address on the user's behalf. The disposable e-mail server 230 generates a disposable e-mail, and communicates the newly created disposable e-mail address back to the creation modules 320. The disposable e-mail server 230 associates the new disposable e-mail with the un-aliased e-mail address of the user. When a message is sent to the disposable e-mail address, the disposable e-mail server 230 forwards the message to the user computer 220 via the user's un-aliased e-mail address based on the filtering criteria provided to the disposable e-mail server 230 by the creation module 320.

The creation module 320 receives the newly created disposable e-mail address and associates 480 it with the recipient of the current communication traffic. The association 480 of the disposable e-mail address with the communication recipient is conveyed to the storage module 330. The storage module 330 receives the associated information and amends the current list of correlated disposable e-mail addresses and their corresponding recipients with the new association.

Figure 4:
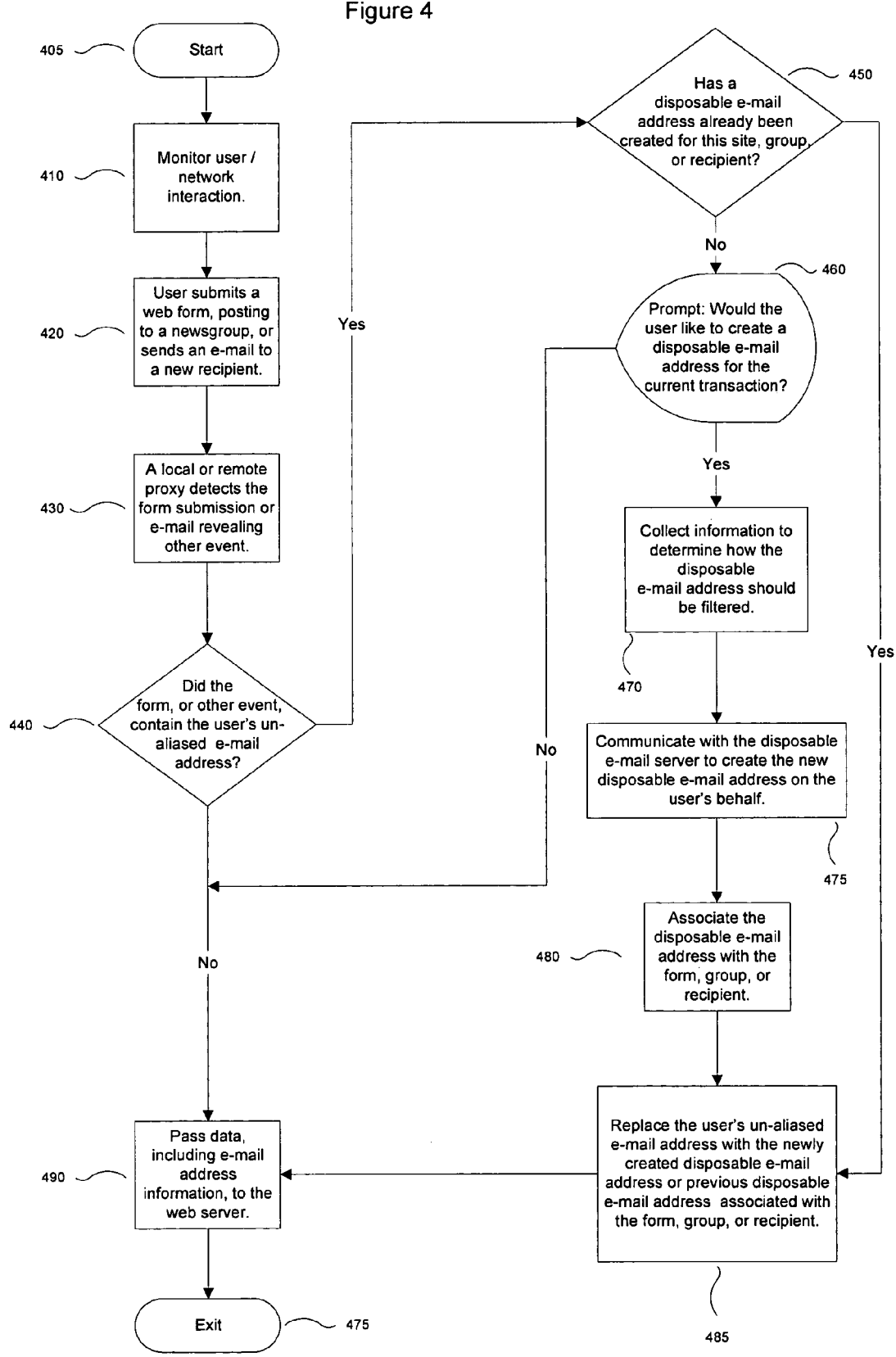
FIG. 4 is a flow diagram of one method embodiment of the present invention for automated creation of disposable e-mail addresses.

FIG. 4 is a flow diagram of one method embodiment for generating disposable e-mail addresses. As previously discussed, a user's interaction with the Internet is monitored 410 by the detection module 310 to determine whether a user's un-aliased e-mail address is being submitted to a website, newsgroup, e-mail recipient, or the like. Given the user's un-aliased e-mail address, communication ports of the user's computer conveying communication traffic of interest are monitored 410 for communication/network traffic likely to contain the user's un-aliased e-mail address. Headers of websites, e-mails, newsgroups, and the like are scanned and analyzed for content associated with the user's un-aliased e-mail address. While websites, e-mails, and newsgroups likely comprise the majority of sites that may solicit a user's e-mail address, the present invention contemplates expanding its monitoring 410 and detection 420 capabilities as necessary to meet the growing threat of spam and other forms of malicious computer code.

In the case of website communications, solicitation of e-mail addresses typically include unique text strings, such as "multipart/form data," and "application/x-www-form-url," found in the content field of HyperText Transport Protocol (HTTP) header information of the website. Unlike websites, newsgroups typically use Network News Transport Protocol (NNTP) to share participant's e-mail addresses. The inherent nature of sharing e-mail addresses within a newsgroup makes them prime targets for spam, and they are therefore monitored closely. Accordingly, the headers of communications using NNTP are examined for fields containing "from" or synonymous terms to indicate whether the traffic possesses e-mail address information.

Likewise, the headers of general e-mail traffic conveyed to an e-mail server 240 are monitored 410 and examined to determine whether the user's un-aliased e-mail address is included in an original e-mail, a forwarding message, or a reply message. As done with respect to NNTP traffic, the header of the Simple Message Transfer Protocol (SMTP) traffic is examined for a "from" field which may contain the user's un-aliased e-mail address. The general monitoring of communication traffic is well known in the relevant art.

When the user submits 420 a form likely to possess e-mail addresses or related information to another party as described above, it is detected 430 and analyzed to determine 440 whether the user's un-aliased e-mail address is contained in the transmission. When the transmission contains the user's un-aliased e-mail address, the detection module 310 queries the storage module 330 to ascertain 450 whether a disposable e-mail address was previously associated the targeted recipient of the transmission. In such a case where a disposable e-mail address is already associated with the recipient, the user's un-aliased e-mail address is replaced 485 with the previously created disposable e-mail address. When the target recipient is not associated with a disposable e-mail address, a prompt 460 is generated asking the user whether the creation of a disposable e-mail address is desired.

When the user decides against the creation of a disposable e-mail address, the communication and conveyance of the user's un-aliased e-mail address occur as originally directed 490, revealing the user's un-aliased e-mail address to the recipient. When the user desires to create a disposable e-mail address, the creation module 320 gathers information 470 about the use of the disposable e-mail address, and communicates 475 this information to the disposable e-mail server 230 for the creation of the disposable e-mail address. The disposable e-mail server 230 creates the new disposable e-mail address and associates it with the user's un-aliased e-mail address. Once created, the new disposable e-mail address is conveyed to the creation module 320 for association 480 with the targeted network destination and used to replace 485 the user's un-aliased e-mail address in the pending communication.

While it is contemplated that the present invention will be used on individual network computers, it is possible to apply the methodology presented here to network environments with multiple computers in several locations. Although not required, method embodiments of the invention can be implemented via computer-executable instructions, such as routines executed by a general purpose computer, e.g., a server or client computer. The computer-executable instructions can be embodied in hardware, firmware, or software residing on at least one computer-readable medium, such as one or more hard disks, floppy disks, optical drives, flash memory, Compact Disks, Digital Video Disks, etc. Those skilled in the relevant art will appreciate that the invention can be practiced with other computer system configurations including Internet appliances, hand-held devices, wearable computers, cellular or mobile phones, multi-processor systems, microprocessor-based or programmable consumer electronics, set-top boxes, network PCs, mini-computers, mainframe computers, and the like.

The invention can be embodied in a special purpose computer or data processor that is specifically programmed, configured, or constructed to perform at least one of the computer-executable instructions as explained herein. The invention can also be practiced in distributed computing environments where tasks or modules are performed by remote processing devices linked through a communications network. In a distributed computing environment, program modules may be located in both local and remote memory storage devices. Furthermore, for purposes of this patent application, "malicious computer code" comprises computer code commonly referred to as computer viruses, worms, Trojan horses, spam, spy-ware, and any other type of unauthorized or unsolicited computer code that appears in or on a computer without an authorized user's knowledge and/or without an authorized user's consent.

The above description is included to illustrate the operation of various embodiments of the invention, and is not meant to limit the scope of the invention. The elements and steps of the various embodiments described above can be combined to provide further embodiments. The scope of the invention is to be limited only by the following claims. Accordingly, from the above discussion, many variations will be apparent to one skilled in the art that would yet be encompassed by the spirit and scope of the present invention.

The invention claimed is:

1. A method for generating disposable e-mail addresses, comprising:
   monitoring, with a computer, network traffic for HyperText Transport Protocol (HTTP) communications;
   detecting, with the computer, an attempted submission to a network destination of a HTTP communication including an un-aliased e-mail address;
   responsive to detecting the attempted submission, seeking, with the computer, authorization to create a disposable e-mail address;
   responsive to receiving authorization, creating, with the computer, the disposable e-mail address;
   associating, with the computer, the newly created disposable e-mail address with the corresponding network destination; and
   replacing, with the computer, the un-aliased e-mail address with the disposable e-mail address in the detected HTTP communication.

2. The method of claim 1 wherein the associating step comprises storing the newly created disposable e-mail address in a correlated list of disposable e-mail addresses and their corresponding network destinations.

3. The method of claim 2 wherein the detecting step comprises examining the correlated list for a disposable e-mail address associated with the network destination, and upon identifying a matching disposable e-mail address with the network destination, replacing the creating, and associating steps with the step of replacing the un-aliased e-mail address with the identified disposable e-mail address.

4. The method of claim 1 wherein the seeking step comprises prompting a human user for authorization to create a disposable e-mail address.

5. The method of claim 1 wherein the seeking step comprises automatically communicating with a device to gain authorization to create a disposable e-mail address.

6. The method of claim 1, wherein the monitoring step comprises scanning HTTP communications for content in website headers associated with an un-aliased e-mail address.

7. The method of claim 1, wherein the monitoring step comprises monitoring a communications port for HTTP communications likely to contain an un-aliased e-mail address.

8. The method of claim 1, wherein the HTTP communications comprise a form submitted to a website.

9. The method of claim 1, wherein the monitoring step comprises monitoring network traffic for Network News Transport Protocol communications (NNTP) and the detecting comprises detecting an attempted submission to a network destination of a NNTP communication including an un-aliased e-mail address.

10. The method of claim 1, wherein the monitoring step comprises monitoring network traffic for Internet Message Access Protocol communications (IMAP) and the detecting comprises detecting an attempted submission to a network destination of a IMAP communication including an un-aliased e-mail address.

11. The method of claim 1, wherein the detecting step comprises detecting an attempted submission to a network destination of a website form including the un-aliased e-mail address.

12. Apparatus for generating disposable e-mail addresses, the apparatus comprising:
a proxy computer interposed between a user computer and a server, the proxy computer comprising:
a detection module adapted to monitor network traffic for HyperText Transport Protocol (HTTP) communications, and to detect a HTTP communication attempting submission of an un-aliased e-mail address to a network destination via network traffic directed to the server;
coupled to the detection module, a disposable e-mail address creation module adapted to seek authorization to create a disposable e-mail address responsive to detection of the attempted submission of an un-aliased e-mail address and create the disposable e-mail address responsive to receiving the authorization; and
coupled to the detection module and to the disposable e-mail address creation module, a storage module adapted to maintain a correlated list of disposable e-mail addresses and their corresponding network destinations.

13. The apparatus of claim 12 wherein the creation module is adapted to associate the newly created disposable e-mail address with corresponding network destinations receiving the un-aliased e-mail address.

14. At least one computer-readable medium containing computer program instructions for generating disposable email addresses, the computer program instructions performing the steps of:
monitoring network traffic for HyperText Transport Protocol (HTTP) communications;
detecting an attempted submission to a network destination of a HTTP communication including an un-aliased e-mail address;
responsive to detecting the attempted submission, seeking authorization to create a disposable e-mail address;
responsive to receiving authorization, creating the disposable e-mail address;
associating the newly created disposable e-mail address with the corresponding network destination; and
replacing the un-aliased e-mail address in the HTTP communications with the disposable e-mail address.

15. The at least one computer-readable medium of claim 14 wherein the associating step comprises storing the newly created disposable e-mail address in a correlated list of disposable e-mail addresses and their corresponding network destinations.

16. The at least one computer-readable medium of claim 15 wherein the detecting step comprises examining the correlated list for a disposable e-mail address associated with the network destination, and upon identifying a matching disposable e-mail address with the network destination, replacing the creating, and associating steps with the step of replacing the un-aliased e-mail address with the identified disposable e-mail address.

17. The at least one computer-readable medium of claim 14 wherein the seeking step comprises prompting a human user for authorization to create a disposable e-mail address.

18. The at least one computer-readable medium of claim 14 wherein the seeking step comprises automatically communicating with a device to gain authorization to create a disposable e-mail address.

19. The at least one computer-readable medium of claim 14, wherein the monitoring step comprises scanning HTTP communications for content in website headers associated with an un-aliased e-mail address.

20. The at least one computer-readable medium of claim 14, wherein the HTTP communications comprise a form submitted to a website.

21. The at least one computer-readable medium of claim 14, wherein the monitoring step comprises monitoring network traffic for Network News Transport Protocol communications (NNTP) and the detecting step comprises detecting an attempted submission to a network destination of a NNTP communication including an un-aliased e-mail address.

22. The at least one computer-readable medium of claim 14, wherein the monitoring step comprises monitoring network traffic for Internet Message Access Protocol communications (IMAP) and the detecting step comprises detecting an attempted submission to a network destination of a IMAP communication including an un-aliased e-mail address.

23. The at least one computer-readable medium of claim 14, wherein the detecting step comprises detecting an attempted submission to a network destination of a website form including the un-aliased e-mail address.

* * * * *